US012744434B1

(12) United States Patent
Miller et al.

(10) Patent No.: US 12,744,434 B1
(45) Date of Patent: Sep. 22, 2026

(54) PRELOAD FORCE OPTIMIZATION FOR STABLE BALL BEARING CONTACT

(71) Applicant: Apple Inc., Cupertino, CA (US)

(72) Inventors: Scott W Miller, Los Gatos, CA (US); Hao Zheng, Cupertino, CA (US)

(73) Assignee: Apple Inc., Cupertino, CA (US)

(*) Notice: Subject to any disclaimer, the term of this patent is extended or adjusted under 35 U.S.C. 154(b) by 175 days.

(21) Appl. No.: 18/885,417

(22) Filed: Sep. 13, 2024

Related U.S. Application Data

(60) Provisional application No. 63/585,178, filed on Sep. 25, 2023.

(51) Int. Cl.

| | |
|---|---|
| ***H02K 11/01*** | (2016.01) |
| ***H02K 11/215*** | (2016.01) |
| ***H02K 41/035*** | (2006.01) |
| ***H04N 23/54*** | (2023.01) |

(52) U.S. Cl.

CPC ....... *H02K 11/0141* (2020.08); *H02K 11/215* (2016.01); *H02K 41/0354* (2013.01); *H04N 23/54* (2023.01)

(58) Field of Classification Search

CPC ............. H02K 11/0141; H02K 11/215; H02K 41/0354; H04N 23/54

USPC .......................................................... 348/345

See application file for complete search history.

(56) References Cited

U.S. PATENT DOCUMENTS

| | | | | |
|---|---|---|---|---|
| 10,310,290 | B2 | 6/2019 | Yu et al. | |
| 11,347,134 | B2 | 5/2022 | Lim et al. | |
| 11,539,869 | B2 | 12/2022 | Birnbaum | |
| 2012/0237147 | A1 | 9/2012 | Utz | |
| 2014/0009631 | A1* | 1/2014 | Topliss ................ | H04N 23/687 348/208.11 |
| 2023/0362490 | A1 | 11/2023 | Smyth | |

FOREIGN PATENT DOCUMENTS

| | | | |
|---|---|---|---|
| CN | 201322820 | | 10/2009 |
| JP | 2009141609 | * | 6/2009 |
| JP | 2015007804 | | 1/2015 |
| WO | 2024018224 | | 1/2024 |

* cited by examiner

*Primary Examiner* — Joel W Fosselman

(74) *Attorney, Agent, or Firm* — Robert C. Kowert; Kowert, Hood, Munyon, Rankin & Goetzel, P.C.

(57) ABSTRACT

Various embodiments include a device (e.g., a camera or other type of device) that optimizes a preload force for a ball bearing voice coil motor (VCM) actuator in order to achieve a stable ball bearing contact. To optimize the preload force, a plate may be placed and/or shaped in a way that causes the center of the preload force to be at a location that results in stable ball bearing contact (e.g., to prevent dynamic tilt/rocking of a frame/carrier during movement). In embodiments, the device includes a flexure (flexible circuit) to supply a drive current to the ball bearing VCM actuator. In some embodiments, the ball bearing VCM actuator is used in a camera device to move an image sensor of a carrier, relative to a lens, to provide focus and/or autofocus (AF) functionality.

20 Claims, 10 Drawing Sheets

PRELOAD FORCE OPTIMIZATION FOR STABLE BALL BEARING CONTACT

PRIORITY CLAIM

This application claims benefit of priority to U.S. Provisional Application Ser. No. 63/585,178, entitled "Preload Force Optimization for Stable Ball Bearing Contact," filed Sep. 25, 2023, and which is hereby incorporated herein by reference in its entirety.

BACKGROUND

Technical Field

This disclosure relates generally to optimizing a preload force for a ball bearing voice coil motor (VCM) actuator in order to achieve a stable ball bearing contact.

Description of the Related Art

Ball bearing VCM actuators are a type of VCM actuator used in various devices in order to allow controlled movement of one or more components back and forth. For example, mobile multipurpose devices such as smartphones and tablet or pad devices may include a high-resolution, small form factor camera that uses a ball bearing VCM actuator to move an image sensor or lens to implement autofocus (AF) functionality. By moving the image sensor or lens, the object focal distance can be adjusted to focus an object plane in front of the camera at an image plane to be captured by the image sensor.

Figure 1A:
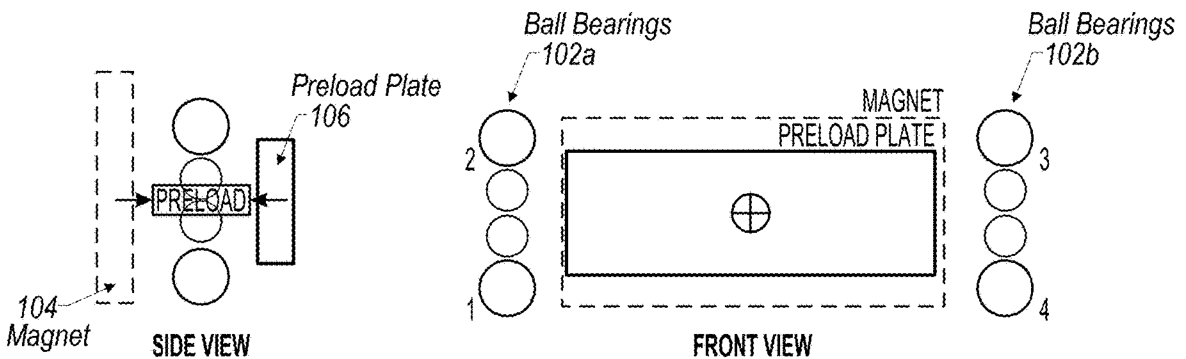
FIG. 1A illustrates a schematic side view and front view of an example arrangement of ball bearings located between a magnet and a preload plate of a ball bearing VCM actuator that causes the center of a preload force to be at a center location of the preload plate, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include a device (e.g., a camera or other type of device) that optimizes a preload force for a ball bearing voice coil motor (VCM) actuator in order to achieve a stable ball bearing contact. As discussed below, to optimize the preload force, a plate may be placed and/or shaped in a way that causes the center of the preload force to be at a location that results in stable ball bearing contact (e.g., to prevent dynamic tilt/rocking of a frame/carrier during movement). In some embodiments, the device includes a flexure (flexible circuit) to supply a drive current to the ball bearing VCM actuator. In embodiments, the ball bearing VCM actuator is used in a camera device to move an image sensor of a carrier, relative to a lens, in a direction parallel to the optical axis, e.g., to provide focus and/or autofocus (AF) functionality.

According to some embodiments, one or more suspension arrangements (e.g., bearing suspension arrangement(s), flexure suspension arrangement(s), etc.) may suspend a carrier (e.g., a moveable frame) from a base structure. For example, a camera may include a ball bearing arrangement to suspend a carrier from a base structure of the camera (e.g., a shield can that encloses components of the camera). The carrier may move on ball bearings so as to allow motion enabled by the actuator. Although a camera is used as an example device that includes a ball bearing VCM actuator, in various embodiments any other type of device/electro-mechanical device that requires movement of a component(s) may include a ball bearing VCM actuator to move the component(s), as described herein. For example, a device with a robotic arm for moving/placing objects or performing other high precision tasks may include the ball bearing VCM actuator (e.g., at an assembly line of a manufacturing facility, a robotic arm used for surgery, etc.).

In some embodiments, a device with a ball bearing VCM actuator may also include a flexure to maintain an electrical connection during movement in order to power the ball bearing VCM actuator. For example, a camera may include a movable frame (carrier) that is fixedly coupled with an image sensor. The ball bearing VCM actuator moves the carrier relative to one or more stationary structures of the camera (e.g., relative to a lens barrel that includes one or more lenses, a shield can, and/or other stationary structure). The ball bearing VCM actuator may include a coil coupled with the carrier, such that the coil moves together with the carrier. Furthermore, the VCM actuator may include a magnet coupled with the stationary structure(s). In some embodiments, the magnet may instead be coupled with the moveable frame and the coil may be coupled with the stationary structure(s).

The flexure may be configured to provide an electrical connection between the coil (and/or other components) and the stationary structure(s). A portion of the flexure may provide sufficient service loop to allow motion of the movable frame enabled by the VCM actuator. The flexure may be configured to convey electrical signals between the stationary structure(s) and the coil via the electrical connection. According to various embodiments, the flexure may include a fixed end portion, a movable end portion, and/or a flexible intermediate portion. The fixed end portion may be fixedly coupled with the stationary structure(s). The movable end portion may be fixedly coupled with the carrier (e.g., any portion/component of the carrier, such as the coil or other portion/component). The flexible intermediate portion may extend from the fixed end portion to the movable end portion and may provide a service loop that allows the motion of the movable frame enabled by the VCM actuator. In embodiments, the flexible portion of the flexure may allow motion of the carrier relative to the stationary structure enabled by the ball bearing VCM actuator while maintaining the electrical connection (the flexure may convey electrical signals between the carrier and the stationary structure via the electrical connection).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
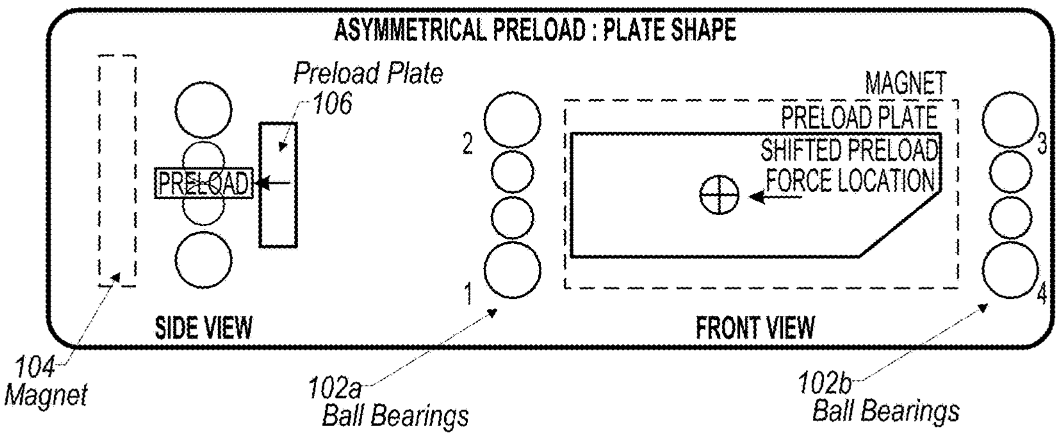
FIG. 1B illustrates a schematic side view and front view of an example arrangement of ball bearings located between a magnet and a preload plate of a ball bearing VCM actuator, where the center of the preload force is located closer to a first set of ball bearings than a second set of ball bearings based on an asymmetric shape of the preload plate, in accordance with some embodiments.
Figure 1C:
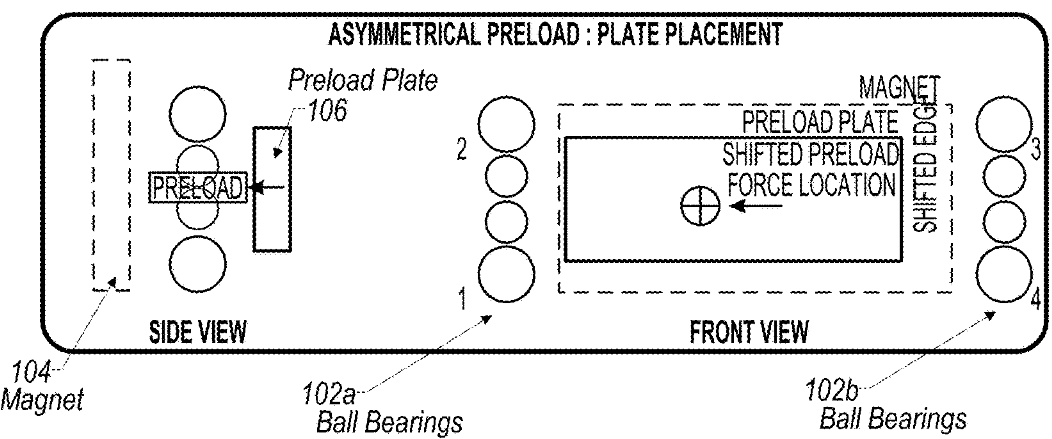
FIG. 1C illustrates a schematic side view and front view of an example arrangement of ball bearings located between a magnet and a preload plate of a ball bearing VCM actuator, where the center of the preload force is located closer to a first set of ball bearings than a second set of ball bearings based on placement of the preload plate closer to a first set of ball bearings than a second set of ball bearings, in accordance with some embodiments.

Described herein are embodiments of a ball bearing VCM actuator as wells as embodiments of a camera having a ball bearing VCM actuator for moving an image sensor (e.g., to provide autofocus (AF) during imaging). FIGS. 1A-1C show different examples of ball bearings located between a magnet and a preload plate of a ball bearing VCM actuator.

FIG. 1A illustrates a schematic side view and front view of an example arrangement of ball bearings 102*a*, 102*b* located between a magnet 104 and a preload plate 106 of a ball bearing VCM actuator that causes the center of a preload force to be at a center location of the preload plate, in accordance with some embodiments. In the depicted embodiment, a preload plate (e.g., made of ferritic material such as steel or another magnet) is attracted to a magnet that sandwiches the ball bearings. The attraction force may be referred to as a preload force (or as a ball bearing preload). In some embodiments, another structure(s) (e.g., another plate) may exist between the preload plate and the ball bearings, such that the preload force is applied through contact with the other structure(s) instead of through direct contact the preload plate itself.

In embodiments, a first set of the ball bearings 102*a* is aligned along a first track and a second set of the ball bearings 102*b* aligned along a second track. In the depicted example, the ball bearings at the end of each set are larger, allowing the preload force to be applied to the four end ball bearings and preventing any of the "filler" ball bearings in between from sharing any of the preload force. The example embodiment represents nominal conditions, in which the 4 ball bearings equally share the preload force (e.g., since the 4 ball bearings are the same size and/or are located at the required distances to allow them to equally share the preload force).

FIG. 1B illustrates a schematic side view and front view of an example arrangement of ball bearings 102*a*, 102*b* located between a magnet 104 and a preload plate 106 of a ball bearing VCM actuator, where the center of the preload force is located closer to a first set of ball bearings 102*a* than a second set of ball bearings 102*b* based on an asymmetric shape of the preload plate 106, in accordance with some embodiments. Due to part tolerances for any number of components of the actuator (e.g., allowing a range of sizes among ball bearings 1, 2, 3, and 4), load may be shared at three ball bearings in the majority of use cases (e.g., during most of the range of motion of the carrier) under nominal acceleration of gravity alone (without sharing load with a fourth ball bearing).

In some embodiments, the preload force may be nominally centered between the four ball bearings 1, 2, 3, 4 and due to a combination of tolerances (e.g. part dimensional and force, both force magnitude and location), may cause a portion of the actuator support to toggle between opposing ball bearings, causing an angular rocking motion ("dynamic tilt"). For example, prior to motion of the carrier, the preload force may initially be shared among ball bearings 1, 2, and 3 (with none of the preload force shared by ball bearing 4) and during motion of the carrier, a portion of the preload force may be shifted to ball bearing 4 so that the preload force is shared among ball bearings 1, 3, and 4 (with none of the preload force shared by ball bearing 2), resulting in a dynamic tilt/rocking of the carrier and/or dynamic tilt/rocking of any number of other components attached/fixedly coupled with the carrier (e.g., an image sensor).

In the depicted example, a center of mass of the preload plate is located closer to at least one of the first plurality of ball bearings 102*a* than the second plurality of ball bearings 102*b*, which causes the center of the preload force to be at (or approximately at) the location shown in the figure (located closer to the first set of ball bearings 102*a* than the second set of ball bearings 102*b*). As depicted, the center of mass of the preload plate is located closer to at least one of the first set of ball bearings 102*a* than the second set of ball bearings 102*b* based on the asymmetric shape of the preload plate.

Figure 2A:
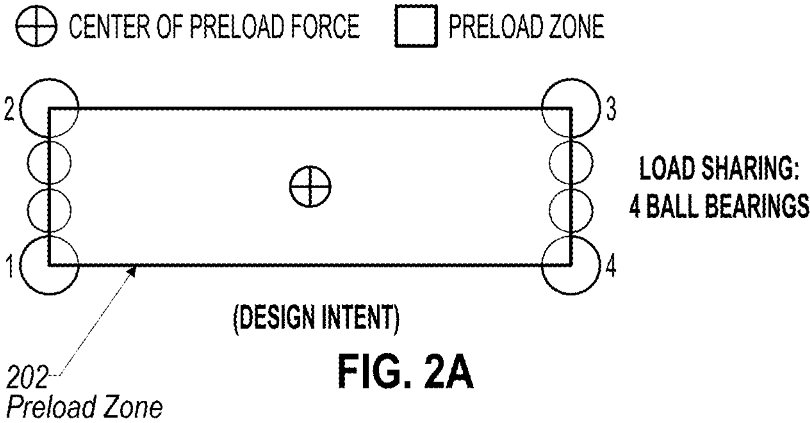
FIG. 2A illustrates a schematic front view of an example arrangement of ball bearings of a ball bearing VCM actuator, in which the center of the preload force is at a center location of the preload plate and the preload force is shared among two ball bearings at each end of a first set of ball bearings and two ball bearings at each end of a second set of ball bearings, in accordance with some embodiments.
Figure 2B:
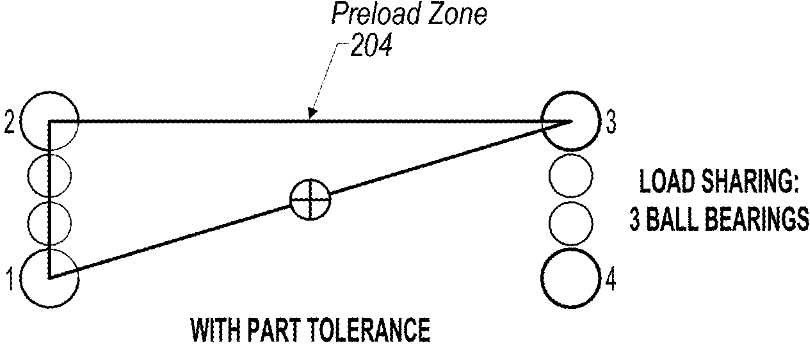
FIG. 2B illustrates a schematic front view of an example arrangement of ball bearings of a ball bearing VCM actuator, in which the center of the preload force is at a center location of the preload plate and part tolerances result in the preload force being shared among two ball bearings at each end of a first set of ball bearings and one ball bearing at one end of a second set of ball bearings, in accordance with some embodiments.
Figure 2C:
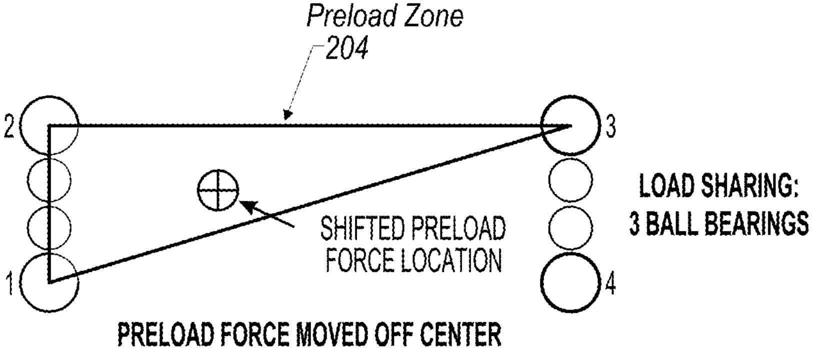
FIG. 2C illustrates a schematic front view of an example arrangement of ball bearings of a ball bearing VCM actuator, in which the preload plate is configured to cause the center of the preload force to be at a location of the preload plate such that the preload force is shared among two ball bearings at each end of a first set of ball bearings and one ball bearing at one end of a second set of ball bearings, and the location of the center of the preload force prevents a portion of the preload force from being shifted to another of the second plurality of ball bearings during the motion of a carrier, in accordance with some embodiments.

As also described for FIG. 2C, the location of the center of the preload force may cause the preload force to be shared among the same three ball bearings (e.g., ball bearings 1, 2, and 3) and prevents a portion of the preload force from being shifted to another ball bearing during the motion of the carrier (e.g., shifted from ball bearing 2 to ball bearing 4 due to reaction forces and torques from the flexure). By preventing the portion of the preload force from being shifted to ball bearing 4, dynamic tilt/rocking of the preload plate and/or carrier can be prevented during the motion. By preventing dynamic tilt/rocking of the preload plate and/or carrier during motion, the quality of image produced by the image sensor is improved.

FIG. 1C illustrates a schematic side view and front view of an example arrangement of ball bearings 102*a*, 102*b* located between a magnet 104 and a preload plate 106 of a ball bearing VCM actuator, where the center of the preload force is located closer to a first set of ball bearings than a second set of ball bearings based on placement of the preload plate closer to a first set of ball bearings than a second set of ball bearings, in accordance with some embodiments. Due to part tolerances for any number of components of the actuator (e.g., allowing a range of sizes among ball bearings 1, 2, 3, and 4), load may be shared at three ball bearings in the majority of use cases (e.g., during most of the range of motion of the carrier) under nominal acceleration of gravity alone (without sharing load with a fourth ball bearing).

As described for FIG. 1B, the preload force may be nominally centered between the four ball bearings 1, 2, 3, 4 and due to a combination of tolerances (e.g., part dimensional and force, both force magnitude and location), may cause a portion of the actuator support to toggle between opposing ball bearings, causing an angular rocking motion ("dynamic tilt"). For example, prior to motion of the carrier, the preload force may initially be shared among ball bearings 1, 2, and 3 (with none of the preload force shared by ball bearing 4) and during motion of the carrier, a portion of the preload force may be shifted to ball bearing 4 so that the preload force is shared among ball bearings 1, 3, and 4 (with none of the preload force shared by ball bearing 2), resulting in a dynamic tilt/rocking of the carrier and/or dynamic tilt/rocking of any number of other components attached/fixedly coupled with the carrier (e.g., an image sensor).

In the depicted example, a center of mass of the preload plate is located closer to at least one of the first plurality of ball bearings 102*a* than the second plurality of ball bearings 102*b*, which causes the center of the preload force to be at (or approximately at) the location shown in the figure (located closer to the first set of ball bearings 102*a* than the second set of ball bearings 102*b*). As depicted, the center of mass of the preload plate is located closer to at least one of the first set of ball bearings 102*a* than the second set of ball bearings 102*b* based on the placement of the preload plate closer to the at least one ball bearing of the first set of ball bearings than the second set of ball bearings.

In some embodiments, techniques described for both FIGS. 1B and 1C may be used to cause the center of the preload force to be at (or approximately at) a particular location of the preload plate. For example, the center of mass of the preload plate is located closer to at least one of the first set of ball bearings 102*a* than the second set of ball bearings 102*b* based on an asymmetric shape of the preload plate and also based on the placement of the preload plate closer to the at least one ball bearing of the first set of ball bearings than the second set of ball bearings.

As also described for FIG. 2C, the location of the center of the preload force may cause the preload force to be shared among the same three ball bearings (e.g., ball bearings 1, 2, and 3) and prevents a portion of the preload force from being shifted to another ball bearing during the motion of the carrier (e.g., shifted from ball bearing 2 to ball bearing 4 due to reaction forces and torques from the flexure). By preventing the portion of the preload force from being shifted to ball bearing 4, dynamic tilt/rocking of the preload plate and/or carrier can be prevented during the motion. By preventing dynamic tilt/rocking of the preload plate and/or carrier during motion, the quality of image produced by the image sensor is improved.

FIG. 2A illustrates a schematic front view of an example arrangement of ball bearings of a ball bearing VCM actuator, in which the center of the preload force is at a center location of the preload plate and the preload force is shared among two ball bearings at each end of a first set of ball bearings and two ball bearings at each end of a second set of ball bearings, in accordance with some embodiments.

The example embodiment represents nominal conditions, in which the 4 ball bearings equally share the preload force (as in FIG. 1A). As in FIGS. 1A-1C, the circle with crosshairs represents the location on the preload plate of the center of the preload force. The area within the box touching ball bearings 1, 2, 3, and 4 represents a preload zone 202 in which the preload force may be shared among ball bearings 1, 2, 3, and 4 (e.g., shared equally or approximately equally, in embodiments). Similarly, the area within the triangle of FIGS. 2B and 2C touching ball bearings 1, 2, and 3 represents a preload zone 204 in which the preload force may be shared among ball bearings 1, 2, and 3 (without being shared by ball bearing 4, in embodiments).

FIG. 2B illustrates a schematic front view of an example arrangement of ball bearings of a ball bearing VCM actuator, in which the center of the preload force is at a center location of the preload plate and part tolerances result in the preload force being shared among two ball bearings at each end of a first set of ball bearings and one ball bearing at one end of a second set of ball bearings, in accordance with some embodiments.

The example embodiment represents an embodiment in which the load may be shared at three ball bearings in the majority of use cases (e.g., for most of the positions of the carrier), as in FIG. 2C. In the depicted example, the preload force may initially be shared among ball bearings 1, 2, and 3 (with none of the preload force shared by ball bearing 4) and during motion of the carrier, a portion of the preload force may be shifted to ball bearing 4 so that the preload force is shared among ball bearings 1, 3, and 4 (with none of the preload force shared by ball bearing 2), resulting in a dynamic tilt/rocking of the carrier and/or dynamic tilt/rocking of any number of other components attached/fixedly coupled with the carrier (e.g., an image sensor).

FIG. 2C illustrates a schematic front view of an example arrangement of ball bearings of a ball bearing VCM actuator, in which the preload plate is configured to cause the center of the preload force to be at a location of the preload plate such that the preload force is shared among two ball bearings at each end of a first set of ball bearings and one ball bearing at one end of a second set of ball bearings, and the location of the center of the preload force prevents a portion of the preload force from being shifted to another of the second plurality of ball bearings during the motion of a carrier, in accordance with some embodiments.

As in FIGS. 1B and 1C, the location of the center of the preload force is moved "off center" compared to FIG. 2B (e.g., by moving the location left or up and to the left in the depicted example), causing the preload force to be shared among the three ball bearings (e.g., ball bearings 1, 2, and 3) and prevents a portion of the preload force from being shifted to another ball bearing during the motion of the carrier (e.g., shifted from ball bearing 2 to ball bearing 4 due to reaction forces and torques from the flexure). By preventing the portion of the preload force from being shifted to ball bearing 4, dynamic tilt/rocking of the preload plate and/or carrier can be prevented during the motion. By preventing dynamic tilt/rocking of the preload plate and/or carrier during motion, the quality of image produced by the image sensor is improved.

Figure 3:
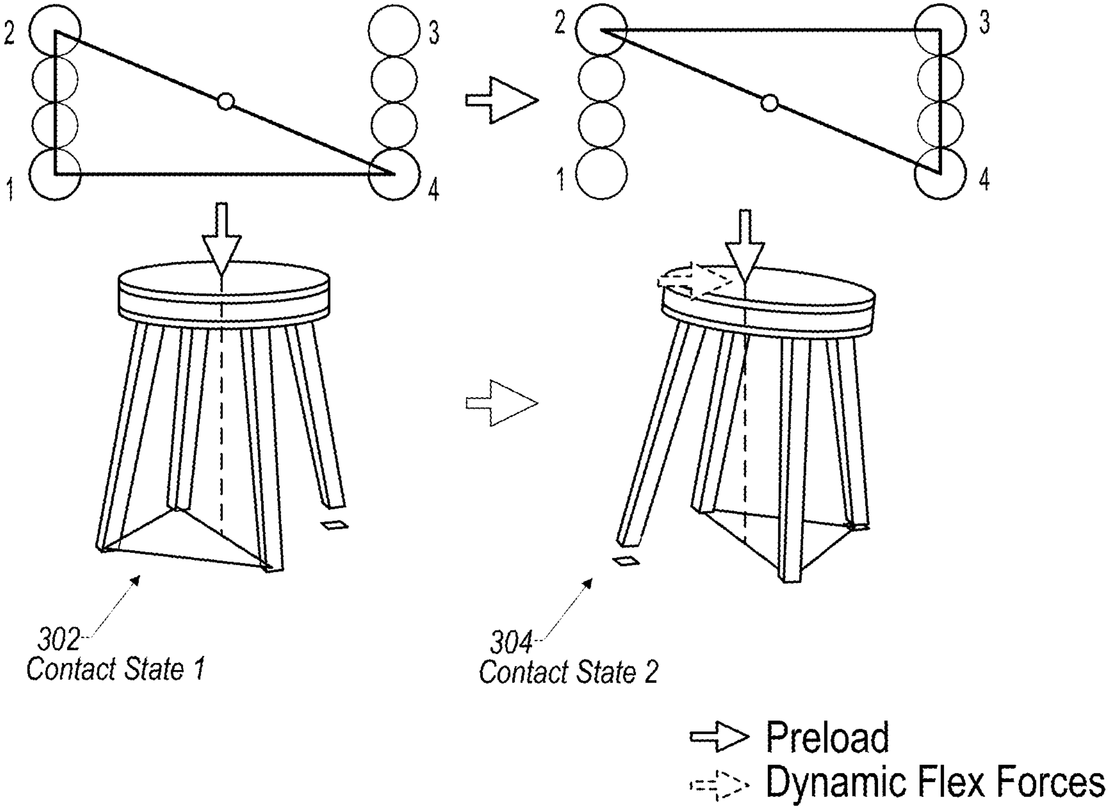
FIG. 3 shows an example stool with bi-stable contact with the ground, in which a portion of a preload force is shifted from one leg to another leg due to a dynamic force applied to the stool.

FIG. 3 shows an example stool with bi-stable contact with the ground, in which a portion of a preload force is shifted from one leg to another leg due to a dynamic force applied to the stool.

As depicted, the stool of FIG. 3 may "toggle" between contact state 1 302 (a preload force pushing down on the stool is shared among legs A, B and C) to contact state 2 304 (a preload force pushing down on the stool is shared among legs B, C, and D) due to another force (analogous to the dynamic flex forces of a flexure) pushing on the stool towards the right. In the depicted example, a portion of the preload is shifted from being shared by leg A in contact state 1 to being shared by leg D in contact state 1.

The ball bearings above each stool depict an example of the ball bearings of FIGS. 1 and 2, in which a portion of the preload is shifted from being shared by ball bearing 1 in a first contact state to being shared by ball bearing 3 in a second contact state. Therefore, both the stool and the ball bearings may toggle between two different contact states due to part intolerances (e.g., different stool leg sizes or different ball bearing sizes), also referred to herein as "bi-stable contact."

Figure 4:
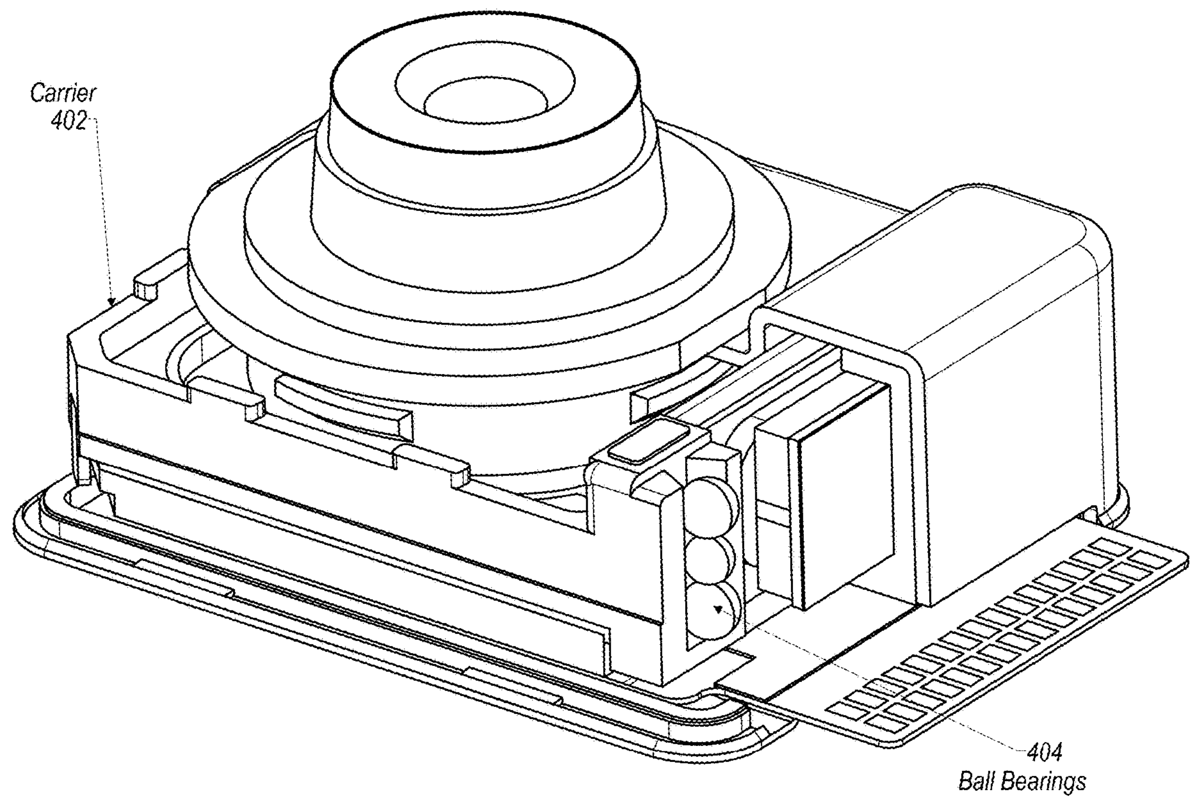
FIG. 4 illustrates a cross-sectional perspective view of an example camera having a ball bearing VCM actuator for moving a carrier of a camera, in accordance with some embodiments.

FIG. 4 illustrates a cross-sectional perspective view of an example camera having a ball bearing VCM actuator for moving a carrier of a camera, in accordance with some embodiments.

As depicted, the camera includes a carrier 402 that moves an image sensor using a ball bearing VCM actuator. In the depicted example, a fixed end of a flexure protrudes from the camera on the right, such that electrical contacts of the flexure are exposed. This may allow the protruding end of the flexure to interface with another device/system and form an electrical connection to perform various functions, (e.g., via insertion of the fixed end of the flexure into another device). The camera includes two sets of ball bearings of a ball bearing VCM actuator, one of the sets of ball bearings is shown in the cross-sectional view (ball bearings 404).

Figure 5:
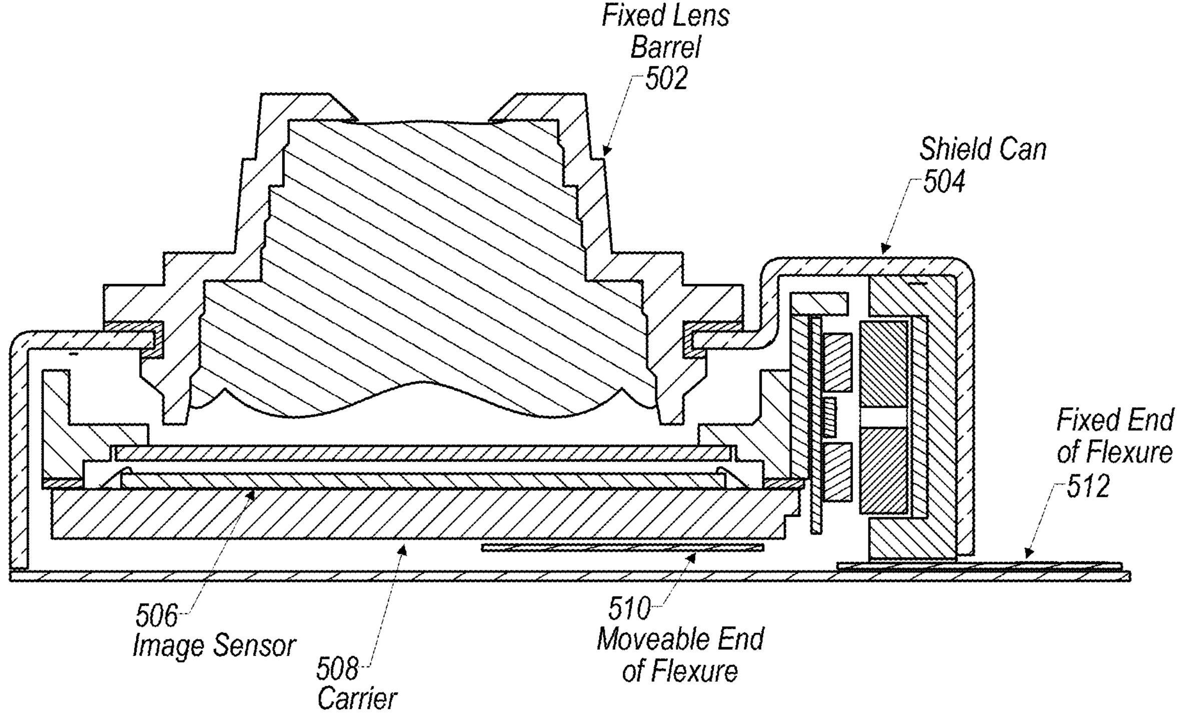
FIG. 5 illustrates a schematic side cross-sectional view of an example camera having a ball bearing VCM actuator for moving an image sensor and a flexure to supply a drive current to the ball bearing VCM actuator, in accordance with some embodiments.

FIG. 5 illustrates a schematic side cross-sectional view of an example camera having a ball bearing VCM actuator for moving an image sensor and a flexure to supply a drive current to the ball bearing VCM actuator, in accordance with some embodiments.

Figure 6A:
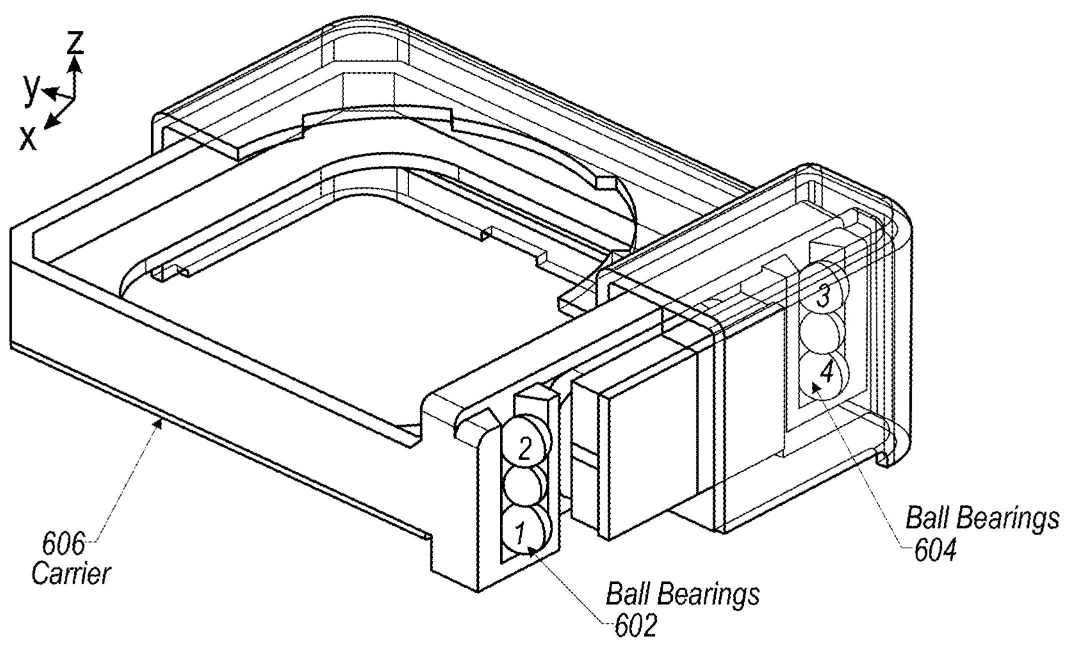
FIG. 6A shows a top perspective view of an example carrier of a camera and ball bearings of a ball bearing VCM actuator, in accordance with some embodiments.

In the depicted example, the camera includes a lens barrel 502 attached to a shield can 504. The shield can may enclose any number of components of the camera. The camera includes an image sensor 506 that is attached to a carrier 508. In embodiments, the carrier 508 may include a substrate (e.g., a substrate that includes electrical components) and/or any other number of components (e.g., an infra-red cutoff filter (IRCF)). For example, the image sensor 506 may be fixedly coupled with the carrier 508 by attaching the image sensor 506 on top of the substrate and/or carrier. The ball bearings of the actuator of the camera are configured to allow motion of the carrier along a first and second track. FIGS. 6A and 8 show examples of ball bearings and tracks. Also shown is a moveable end 510 of a flexure and a fixed end 512 of a flexure (e.g., flexure 720 of FIG. 7). Although not shown in this figure, the flexure also includes a flexible portion that allows motion of the carrier relative to a stationary structure (e.g., a lens of the camera and/or the shield can) enabled by the ball bearing VCM actuator while maintaining an electrical connection (e.g., to convey electrical signals between the carrier and another stationary structure of the camera, such as the fixed end 510 of the flexure).

FIG. 6A shows a top perspective view of an example carrier of a camera and ball bearings of a ball bearing VCM actuator, in accordance with some embodiments. In embodiments, a ball bearing suspension arrangement includes a first track enclosing a first set of ball bearings 602 and a second track enclosing a second set of the ball bearings 604. In embodiments, the first track and ball bearings 602 is located at (or approximately at) a first corner of a carrier 606, and a second track and ball bearings 602 is located at (or approximately at) a second corner of the carrier 606 that is adjacent to the first corner of the carrier.

In the depicted example, two portions (also referred to as "segments" or "raceways") of each track on the carrier side are shown; however, in embodiments, a given track for a set of ball bearings may include any number of portions of the carrier and any number of portions of a base structure that (FIG. 8A depicts a top view of another example of tracks, showing portions of the tracks formed by the carrier and the base). Although three ball bearings are shown in each group of the example embodiment, in various embodiments any other number of ball bearings may be used in each group. Although middle "filler" ball bearing(s) are smaller in size than the end ball bearings (end ball bearings A, B, C, D) in the example embodiment, in various embodiments any of the ball bearings may be any size (e.g., any give ball bearing may be the same or different in size that any other ball bearing). Any combination of sizes and/or numbers of ball bearings may be used, in various embodiments. Furthermore, some embodiments may use objects other than filler ball bearings to fill the space between ball bearings.

The carrier may be configured to translate in the Z-axis direction, e.g., via the ball bearings disposed between the carrier and a side of the base structure (e.g., shield can or other structure). According to some examples, the Z-axis translation movement may be used to provide AF movement of an image on the image sensor. In some embodiments, the ball bearings may reside within one or more Z-translation tracks defined, e.g., by the carrier and/or the base structure. For example, a particular track may include a group of raceways that enclose a group of ball bearings. Respective ones of the tracks may be oriented in the same direction to allow for constrained movement in a common direction (e.g., in the Z-axis direction). An inner side of the base structure (e.g., shield can of other structure) may be shaped so as to define one or more grooves, recesses, pockets, etc., that at least partially form the Z-translation track(s). Additionally, or alternatively, a side of the first portion of carrier may be shaped so as to define one or more grooves, recesses, pockets, etc., that at least partially form the Z-translation track(s). In some embodiments, the Z-translation ball bearings may be disposed within respective spaces of the Z-translation track(s) that may be sized to accommodate the Z-translation ball bearings between the side of the base structure and the side of the carrier.

Figure 6B:
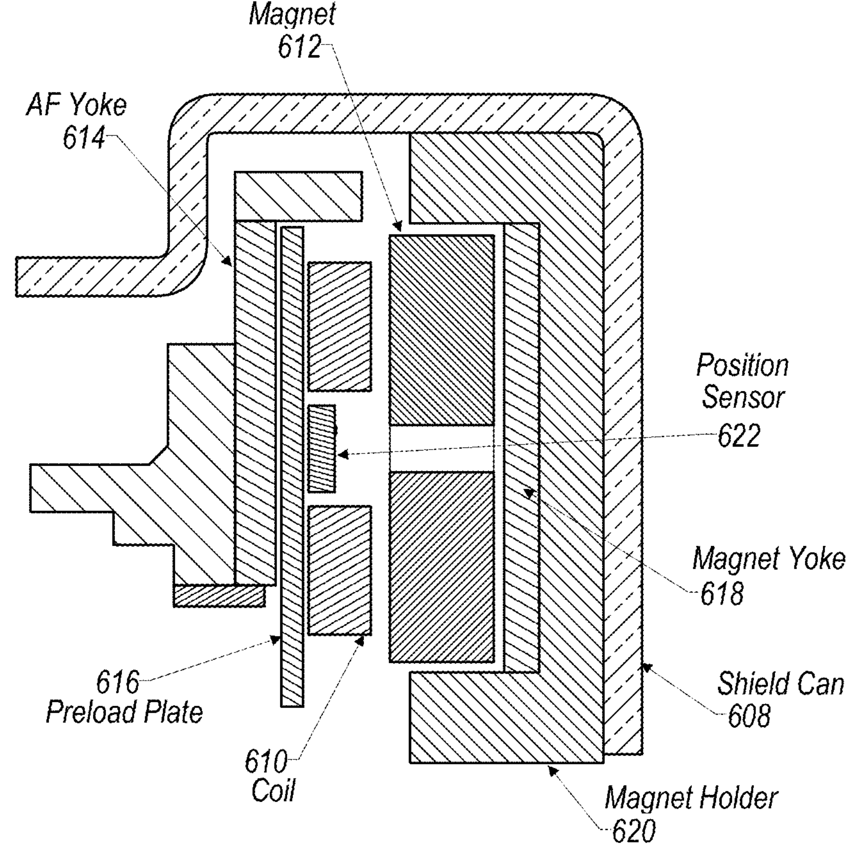
FIG. 6B illustrates a schematic side cross-sectional view of an example ball bearing VCM actuator for moving a carrier of a camera, in accordance with some embodiments.

FIG. 6B illustrates a schematic side cross-sectional view of an example ball bearing VCM actuator for moving a carrier of a camera, in accordance with some embodiments. In various embodiments, the ball bearing VCM actuator may include some or all of the components shown.

In embodiments, a ball bearing suspension arrangement of the ball bearing VCM actuator may be configured to suspend a carrier 606 with an image sensor from a base structure (e.g., shield can 608) of the camera. This may allow the carrier to move on one or more of the ball bearings 602 so as to allow motion of the carrier in the z-directions (e.g., towards or away from the lens barrel) enabled by the ball bearing VCM actuator.

According to various embodiments, the actuator may include one or more coil(s) 610 that can electromagnetically interact (e.g., when electrical current is provided to the coil) with one or more magnets 612 to produce Lorentz forces that move the carrier, e.g., via controlled movement in directions allowed by the bearing suspension arrangement (e.g., towards or away from the lens barrel). In the depicted example, the carrier is attached to a portion of the AF yoke 614.

In some embodiments, the magnet 612 and the coil 610 may be positioned proximate one another so that they can electromagnetically interact with each other to shift the carrier with the image sensor (e.g., relative to the lens barrel) in the Z-axis direction, to provide AF movement of an image on the image sensor. While some aspects of the actuator may be referred to herein in terms of "AF," it should be understood that such aspects may additionally, or alternatively, be referred to in terms of "focus," in some embodiments.

In the depicted example, the ball bearing VCM actuator includes a preload plate 616 (e.g., ferritic plate) positioned proximate the AF magnet 612 to preload the Z-translation ball bearings with a load in a direction orthogonal to the Z-axis direction (e.g., in the X-axis direction). As shown, the plate 616 may be disposed between the coil 610 and an AF yoke 614. In embodiments, the preload force prevents the carrier from tilting towards or away from the lens barrel during movement (e.g., causing dynamic tilt/rocking).

In embodiments, the ball bearing VCM actuator may include any number of ferritic components for preloading the Z-translation ball bearings. Additionally, or alternatively, one or more other magnets (not shown) may be included to magnetically interact with the ferritic component(s), to preload the Z-translation ball bearings in some embodiments. The depicted example also includes a magnet yoke 618 and magnet holder 620 that hold the magnet in place.

In some embodiments, the camera may include a position sensor 622 that is fixedly coupled with the preload plate 626 (in embodiments, it may be coupled to any other suitable component) and is proximate to the coil. In some embodiments, the position sensor may be a magnetic field sensor, such as a Hall sensor, tunneling magnetoresistance (TMR) sensor, giant magnetoresistance (GMR) sensor, etc. for position sensing with respect AF movement. The position sensor 622 may be used to detect magnetic field changes, e.g., as the position sensor 622 moves (together with the coil and carrier) in the Z-axis direction relative to the magnet 612. In some non-limiting examples, the position sensor 622 may be encircled by the coil 610.

Figure 7:
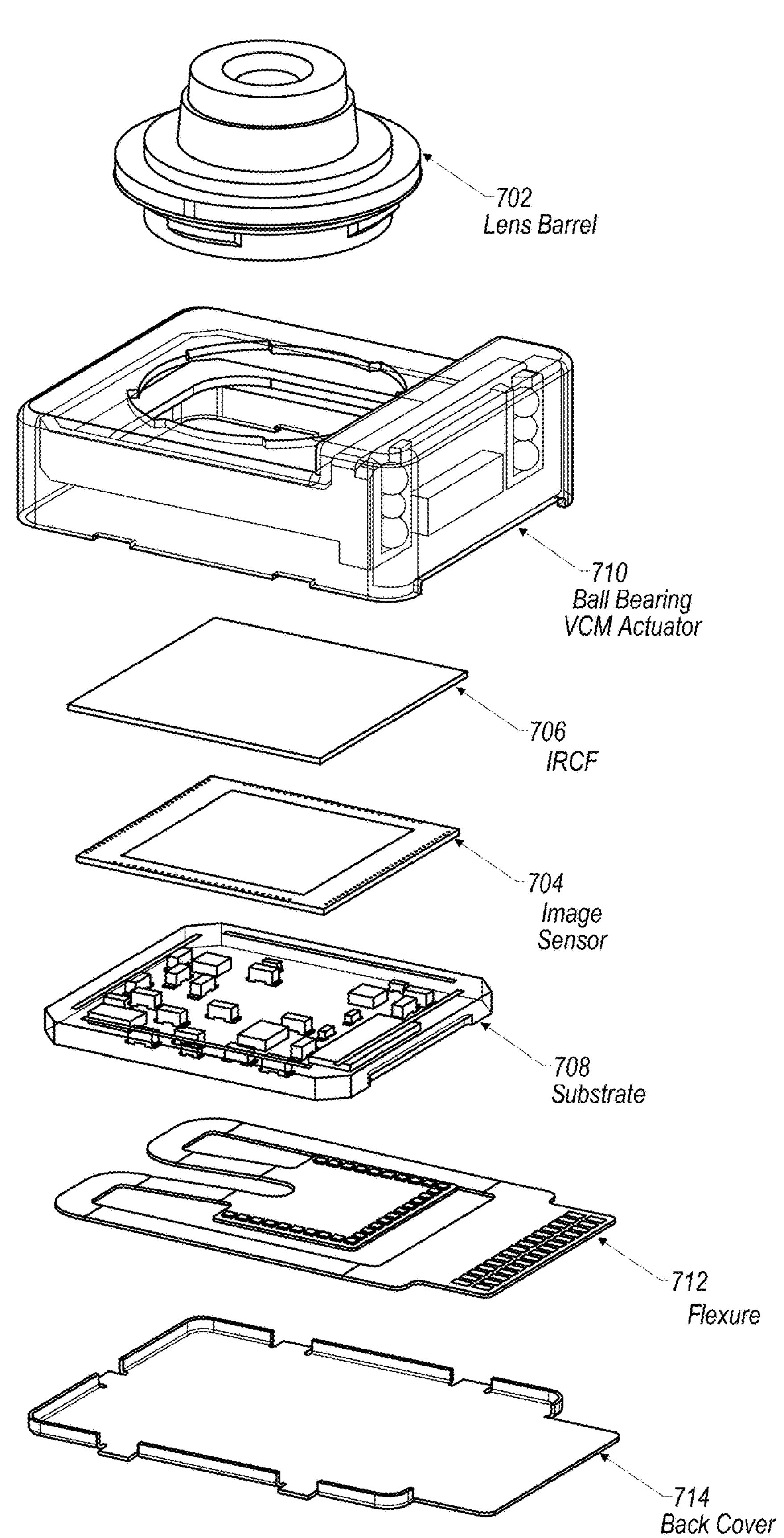
FIG. 7 illustrates a top perspective exploded view of an example camera having a ball bearing VCM actuator for moving an image sensor and a flexure to supply a drive current to the ball bearing VCM actuator, in accordance with some embodiments, in accordance with some embodiments.
Figure 8:
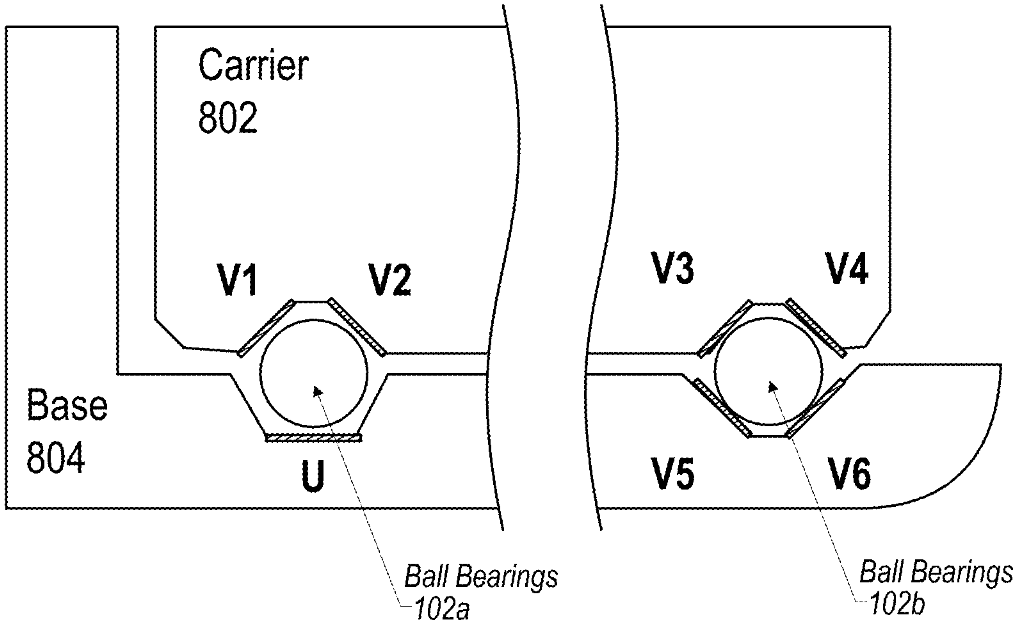
FIG. 8 illustrates a schematic top cross-sectional view of an example bearing suspension arrangement having a first group of raceways of a carrier and a stationary structure that form a first track and a second group of raceways of a carrier and a stationary structure that form a second track, in accordance with some embodiments.

FIG. 7 illustrates a top perspective exploded view of an example camera having a ball bearing VCM actuator for moving an image sensor and a flexure to supply a drive current to the ball bearing VCM actuator, in accordance with some embodiments, in accordance with some embodiments.

The depicted example camera include a lens barrel 702 that includes at least one lens. In embodiments, the camera may also include a shield can that is attached to the lens barrel. The camera also includes an image sensor 108 to capture image data based on light that has passed through the at least one lens. In embodiments, the carrier is fixedly coupled with the image sensor 704. As shown, an IRCF 706 may be placed above the image sensor 704, which itself is placed above a substrate 708 that houses electrical components.

The ball bearing VCM actuator 710 may move the carrier and image sensor relative to the lens barrel. The ball bearing VCM actuator 710 may include a coil fixedly coupled with the carrier, such that the coil moves together with the carrier. For example, the ball bearing VCM actuator 710 may operate in the same or similar manner as the actuator of FIGS. 6A and 6B.

In embodiments, the flexure 712 provides an electrical connection between the carrier and a stationary structure of the camera, wherein a flexible portion of the flexure allows motion of the carrier relative to the stationary structure enabled by the ball bearing VCM actuator while maintaining the electrical connection. The flexure conveys electrical signals between the carrier and the stationary structure via the electrical connection. The example camera also includes a back cover 714. A moveable end of the flexure may be attached to the substrate.

FIG. 8 illustrates a schematic top cross-sectional view of an example bearing suspension arrangement having a first group of raceways of a carrier and a stationary structure that form a first track and a second group of raceways of a carrier and a stationary structure that form a second track, in accordance with some embodiments.

In the depicted example, a ball bearing suspension arrangement of the ball bearing VCM actuator includes a first group of raceways (V1, V2, and U) enclosing a first group of the ball bearings to form a first track and a second group of raceways (V3, V4, V5, and V6) enclosing a second group of the ball bearings to form a second track, wherein the first group of raceways is located approximately at a first corner of the carrier 802, and wherein the second group of raceways is located approximately at a second corner of the carrier 802 that is adjacent to the first corner of the carrier (e.g., as in FIG. 6A).

As shown, raceways V1, V2, V3, and V4 are formed on the carrier and raceways U, V5, and V6 are on the base 804 (e.g., the shield can or other stationary structure attached to the shield can directly or indirectly). Although the depicted example has three raceways for the first track and four raceways for the second track, in various embodiments each track may include any number of raceways formed on the carrier side and on the base side.

Figure 9:
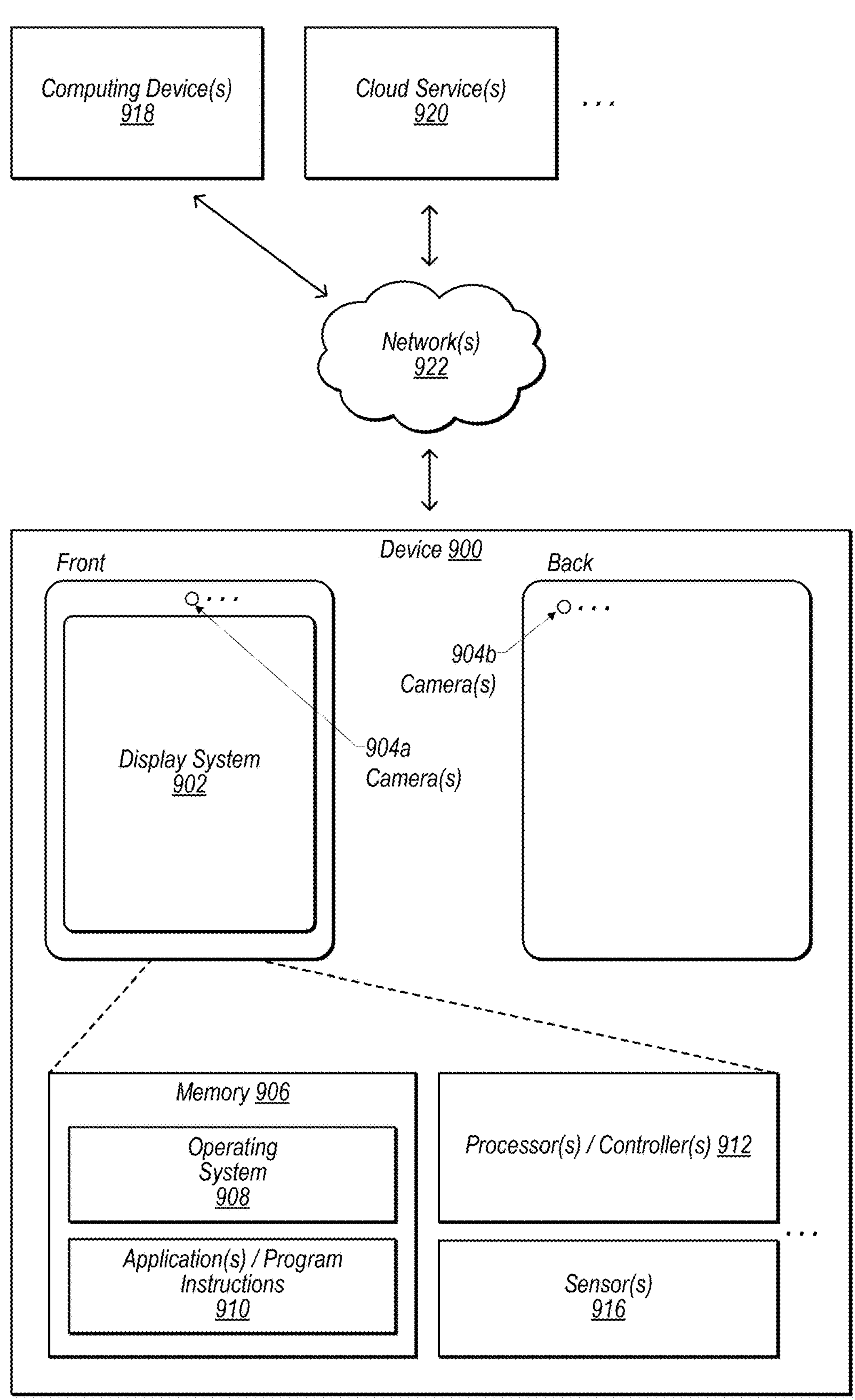
FIG. 9 illustrates a schematic representation of an example device that may include a camera having a ball bearing VCM actuator for moving an image sensor and a flexure to supply a drive current to the ball bearing VCM actuator, in accordance with some embodiments.

FIG. 9 illustrates a schematic representation of an example device 900 that may include a camera (e.g., the camera of FIGS. 4 and 5, etc.) having a ball bearing VCM actuator in order to achieve a stable ball bearing contact, in accordance with some embodiments. In some embodiments, processor(s) of the device 900 (or system 1000) may cause the camera to perform any of the functions or actions described herein for the camera. For example, one or more processors of the device or system may cause the ball bearing VCM actuator to move the carrier in at least one direction parallel to an optical axis defined by the at least one lens.

In some embodiments, the device 900 may be a mobile device and/or a multifunction device. In various embodiments, the device 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 900 may include a display system 902 (e.g., comprising a display and/or a touch-sensitive surface) and/or one or more cameras 904. In some non-limiting embodiments, the display system 902 and/or one or more front-facing cameras 904*a* may be provided at a front side of the device 900, e.g., as indicated in FIG. 9. Additionally, or alternatively, one or more rear-facing cameras 904*b* may be provided at a rear side of the device 900. In some embodiments comprising multiple cameras 904, some or all of the cameras may be the same as, or similar to, each other. Additionally, or alternatively, some or all of the cameras may be different from each other. In various embodiments, the location(s) and/or arrangement(s) of the camera(s) 904 may be different than those indicated in FIG. 9.

Among other things, the device 900 may include memory 906 (e.g., comprising an operating system 908 and/or application(s)/program instructions 910), one or more processors and/or controllers 912 (e.g., comprising CPU(s), memory controller(s), display controller(s), and/or camera controller(s), etc.), and/or one or more sensors 916 (e.g., orientation sensor(s), proximity sensor(s), and/or position sensor(s), etc.). In some embodiments, the device 900 may communicate with one or more other devices and/or services, such as computing device(s) 918, cloud service(s) 920, etc., via one or more networks 922. For example, the device 900 may include a network interface (e.g., network interface 1110 in FIG. 11) that enables the device 900 to transmit data to, and receive data from, the network(s) 922. Additionally, or alternatively, the device 900 may be capable of communicating with other devices via wireless communication using any of a variety of communications standards, protocols, and/or technologies.

Figure 10:
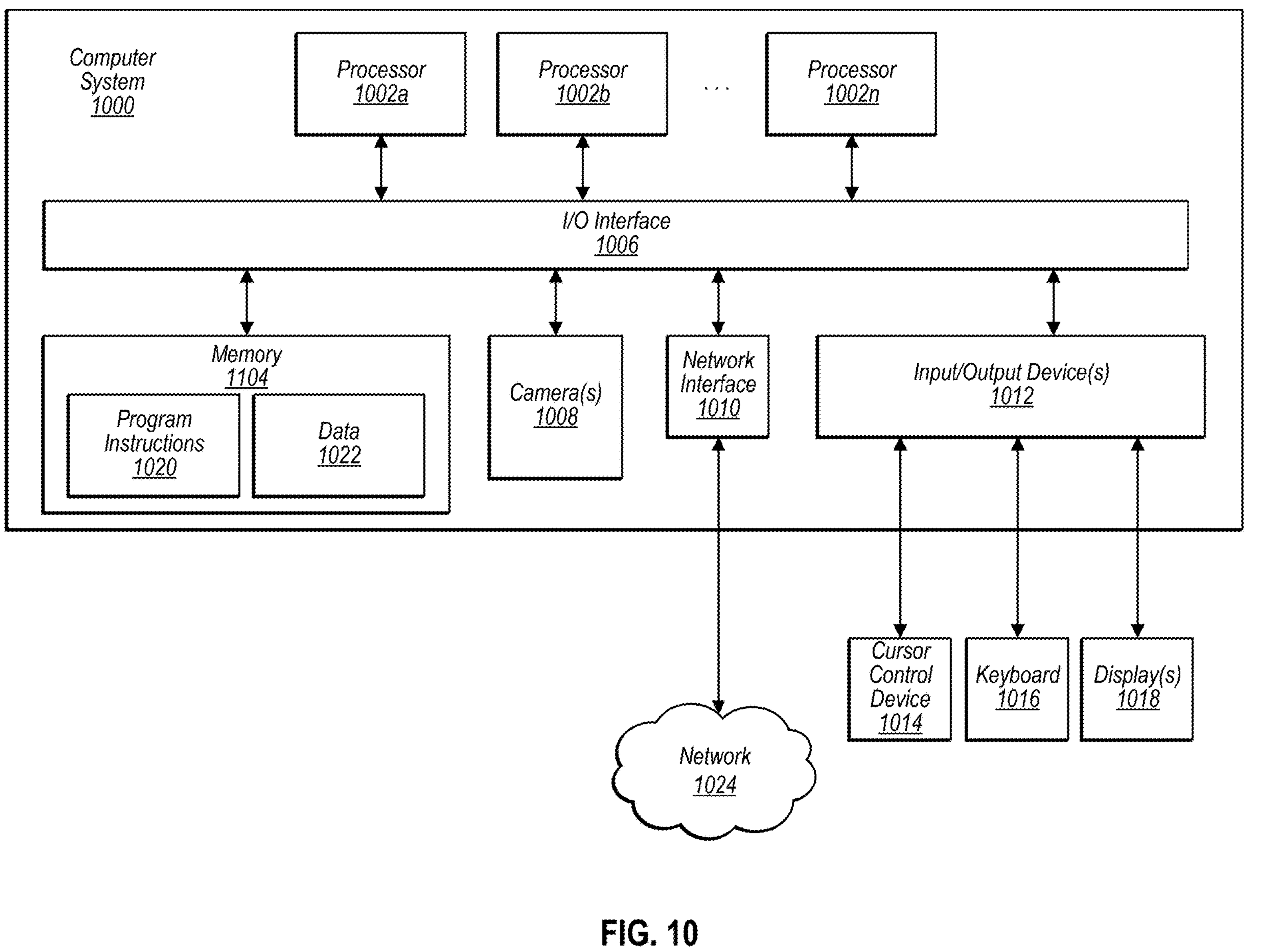
FIG. 10 illustrates a schematic block diagram of an example computer system that may include a camera having a ball bearing VCM actuator for moving an image sensor and a flexure to supply a drive current to the ball bearing VCM actuator, in accordance with some embodiments.

FIG. 10 illustrates a schematic block diagram of an example computing device, referred to as computer system 1000, that may include or host embodiments of a camera having a ball bearing VCM actuator in order to achieve a stable ball bearing contact, e.g., as described herein with reference to FIGS. 1-9. In addition, computer system 1000 may implement methods for controlling operations of the camera and/or for performing image processing images captured with the camera. In some embodiments, the device 900 (described herein with reference to FIG. 9) may additionally, or alternatively, include some or all of the functional components of the computer system 1000 described herein.

The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1000 includes one or more processors 1002 coupled to a system memory 1004 via an input/output (I/O) interface 1006. Computer system 1000 further includes one or more cameras 1008 coupled to the I/O interface 1006. Computer system 1000 further includes a network interface 1010 coupled to I/O interface 1006, and one or more input/output devices 1012, such as cursor control device 1014, keyboard 1016, and display(s) 1018. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1002, or a multiprocessor system including several processors 1002 (e.g., two, four, eight, or another suitable number). Processors 1002 may be any suitable processor capable of executing instructions. For example, in various embodiments processors 1002 may be general-purpose or embedded processors implementing any of a variety of instruction set architectures (ISAs), such as the x86, PowerPC, SPARC, or MIPS ISAs, or any other suitable ISA. In multiprocessor systems, each of processors 1002 may commonly, but not necessarily, implement the same ISA.

System memory 1004 may be configured to store program instructions 1020 accessible by processor 1002. In various embodiments, system memory 1004 may be implemented using any suitable memory technology, such as static random access memory (SRAM), synchronous dynamic RAM (SDRAM), nonvolatile/Flash-type memory, or any other type of memory. Additionally, existing camera control data 1022 of memory 1004 may include any of the information or data structures described above. In some embodiments, program instructions 1020 and/or data 1022 may be received, sent or stored upon different types of computer-accessible media or on similar media separate from system memory 1004 or computer system 1000. In various embodiments, some or all of the functionality described herein may be implemented via such a computer system 1000.

In one embodiment, I/O interface 1006 may be configured to coordinate I/O traffic between processor 1002, system memory 1004, and any peripheral devices in the device, including network interface 1010 or other peripheral interfaces, such as input/output devices 1012. In some embodiments, I/O interface 1006 may perform any necessary protocol, timing or other data transformations to convert data signals from one component (e.g., system memory 1004) into a format suitable for use by another component (e.g., processor 1002). In some embodiments, I/O interface 1006 may include support for devices attached through various types of peripheral buses, such as a variant of the Peripheral Component Interconnect (PCI) bus standard or the Universal Serial Bus (USB) standard, for example. In some embodiments, the function of I/O interface 1006 may be split into two or more separate components, such as a north bridge and a south bridge, for example. Also, in some embodiments some or all of the functionality of I/O interface 1006, such as an interface to system memory 1004, may be incorporated directly into processor 1002.

Network interface 1010 may be configured to allow data to be exchanged between computer system 1000 and other devices attached to a network 1024 (e.g., carrier or agent devices) or between nodes of computer system 1000. Network 1024 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1010 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1012 may, in some embodiments, include one or more display terminals, keyboards, keypads, touchpads, scanning devices, voice or optical recognition devices, or any other devices suitable for entering or accessing data by one or more computer systems 1000. Multiple input/output devices 1012 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1010.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:

a shield can that houses components of the camera;

a carrier fixedly coupled with at least one component of the camera; and a ball bearing voice coil motor (VCM) actuator to move the carrier relative to the shield can, the ball bearing VCM actuator comprising:

a coil;

a magnet;

a first plurality of ball bearings aligned along a first track and a second plurality of ball bearings aligned along a second track, wherein the first and second track are respectively formed by one or more portions of the carrier and one or more portions of a stationary structure of the camera, and wherein the ball bearings are configured to allow motion of the carrier along the first and second tracks, and wherein the first and second plurality of ball bearings are located between the magnet and a preload plate; and the preload plate, wherein the preload plate is magnetically attracted to the magnet to cause a preload force, and wherein the preload plate is configured to cause a center of the preload force to be at a location of the preload plate such that the preload force is shared among two of the first plurality of ball bearings and one of the second plurality of ball bearings, and wherein the location of the center of the preload force prevents a portion of the preload force from being shifted to another of the second plurality of ball bearings during the motion of the carrier.

2. The camera of claim 1, wherein to cause the center of the preload force to be at the location of the preload plate, a center of mass of the preload plate is located closer to at least one of the first plurality of ball bearings than the second plurality of ball bearings.

3. The camera of claim 2, wherein the center of mass of the preload plate is located closer to the at least one of the first plurality of ball bearings than the second plurality of ball bearings based on one or more of:

placement of the preload plate closer to the at least one of the first plurality of ball bearings than the second plurality of ball bearings, or an asymmetric shape of the preload plate.

4. The camera of claim 1, wherein the at least one component fixedly coupled with the carrier comprises an image sensor to capture image data based on light that has passed through at least one lens of the camera.

5. The camera of claim 1, wherein the coil is fixedly coupled with the carrier, such that the coil moves together with the carrier.

6. The camera of claim 1, further comprising a flexure provides an electrical connection between the carrier and another stationary structure of the camera, wherein a flexible portion of the flexure allows motion of the carrier relative to the other stationary structure enabled by the ball bearing VCM actuator while maintaining the electrical connection, and wherein the flexure conveys electrical signals between the carrier and the other stationary structure via the electrical connection.

7. The camera of claim 1, wherein the first plurality of ball bearings comprises one or more ball bearings between the two ball bearings that are smaller in size than the two ball bearings.

8. A device, comprising:

one or more processors;

memory storing program instructions executable by the one or more processors to control operation of a camera; and the camera, comprising:

a shield can that houses components of the camera;

a carrier fixedly coupled with at least one component of the camera; and a ball bearing voice coil motor (VCM) actuator to move the carrier relative to the shield can, the ball bearing VCM actuator comprising:

a coil;

a magnet;

a first plurality of ball bearings aligned along a first track and a second plurality of ball bearings aligned along a second track, wherein the first and second track are respectively formed by one or more portions of the carrier and one or more portions of a stationary structure of the camera, and wherein the ball bearings are configured to allow motion of the carrier along the first and second tracks, and wherein the first and second plurality of ball bearings are located between the magnet and a preload plate; and the preload plate, wherein the preload plate is magnetically attracted to the magnet to cause a preload force, and wherein the preload plate is configured to cause a center of the preload force to be at a location of the preload plate such that the preload force is shared among two of the first plurality of ball bearings and one of the second plurality of ball bearings, and wherein the location of the center of the preload force prevents a portion of the preload force from being shifted to another of the second plurality of ball bearings during the motion of the carrier.

9. The device of claim 8, wherein to cause the center of the preload force to be at the location of the preload plate, a center of mass of the preload plate is located closer to at least one of the first plurality of ball bearings than the second plurality of ball bearings.

10. The device of claim 9, wherein the center of mass of the preload plate is located closer to the at least one of the first plurality of ball bearings than the second plurality of ball bearings based on one or more of:

placement of the preload plate closer to the at least one of the first plurality of ball bearings than the second plurality of ball bearings, or an asymmetric shape of the preload plate.

11. The device of claim 8, wherein the at least one component fixedly coupled with the carrier comprises an image sensor to capture image data based on light that has passed through at least one lens of the camera.

12. The device of claim 8, wherein the coil is fixedly coupled with the carrier, such that the coil moves together with the carrier.

13. The device of claim 8, further comprising a flexure provides an electrical connection between the carrier and another stationary structure of the camera, wherein a flexible portion of the flexure allows motion of the carrier relative to the other stationary structure enabled by the ball bearing VCM actuator while maintaining the electrical connection, and wherein the flexure conveys electrical signals between the carrier and the other stationary structure via the electrical connection.

14. The device of claim 8, wherein the first plurality of ball bearings comprises one or more ball bearings between the two ball bearings that are smaller in size than the two ball bearings.

15. The device of claim 8, wherein the one or more processors are configured to cause the ball bearing VCM actuator to move the carrier in at least one direction parallel to an optical axis defined by at least one lens of the camera.

16. A ball bearing voice coil motor (VCM) actuator, the ball bearing VCM actuator comprising:

a coil;

a magnet;

a first plurality of ball bearings aligned along a first track and a second plurality of ball bearings aligned along a second track, wherein the first and second track are respectively formed by one or more portions of a carrier and one or more portions of a stationary structure of a device, and wherein the ball bearings are configured to allow motion of the carrier relative to the stationary structure along the first and second tracks, and wherein the first and second plurality of ball bearings are located between the magnet and a preload plate; and the preload plate, wherein the preload plate is magnetically attracted to the magnet to cause a preload force, and wherein the preload plate is configured to cause a center of the preload force to be at a location of the preload plate such that the preload force is shared among two of the first plurality of ball bearings and one of the second plurality of ball bearings, and wherein the location of the center of the preload force prevents a portion of the preload force from being shifted to another of the second plurality of ball bearings during the motion of the carrier.

17. The ball bearing VCM actuator of claim 16, wherein to cause the center of the preload force to be at the location of the preload plate, a center of mass of the preload plate is located closer to at least one of the first plurality of ball bearings than the second plurality of ball bearings.

18. The ball bearing VCM actuator of claim 17, wherein the center of mass of the preload plate is located closer to the at least one of the first plurality of ball bearings than the second plurality of ball bearings based on one or more of:

placement of the preload plate closer to the at least one of the first plurality of ball bearings than the second plurality of ball bearings, or an asymmetric shape of the preload plate.

19. The ball bearing VCM actuator of claim 16, wherein the device is a camera, and wherein the carrier is fixedly coupled with an image sensor to capture image data based on light that has passed through at least one lens of the camera.

20. The ball bearing VCM actuator of claim 16, wherein the coil is fixedly coupled with the carrier, such that the coil moves together with the carrier.

* * * * *